United States Patent
Beekman et al.

(10) Patent No.: US 8,884,216 B2
(45) Date of Patent: Nov. 11, 2014

(54) GAS DETECTION AND QUANTIFICATION METHOD USING A PULSED NEUTRON LOGGING TOOL

(75) Inventors: Sicco Beekman, Houston, TX (US);
Tong Zhou, Sugar Land, TX (US);
Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/994,870

(22) PCT Filed: Dec. 16, 2011

(86) PCT No.: PCT/US2011/065570
§ 371 (c)(1),
(2), (4) Date: Sep. 19, 2013

(87) PCT Pub. No.: WO2012/083210
PCT Pub. Date: Jun. 21, 2012

(65) Prior Publication Data
US 2014/0001350 A1    Jan. 2, 2014

Related U.S. Application Data

(60) Provisional application No. 61/424,420, filed on Dec. 17, 2010.

(51) Int. Cl.
*G01V 5/08* (2006.01)
*H01S 1/00* (2006.01)
*G01V 5/12* (2006.01)
*G01V 5/10* (2006.01)

(52) U.S. Cl.
CPC ............... *G01V 5/102* (2013.01); *G01V 5/125* (2013.01)
USPC ...................................... 250/269.6; 250/251

(58) Field of Classification Search
USPC ......... 250/250, 251, 252, 253, 254, 255, 256, 250/257, 258, 259, 260, 261, 262, 263, 264, 250/265, 266, 269.6
See application file for complete search history.

(56) References Cited

U.S. PATENT DOCUMENTS

| | | | |
|---|---|---|---|
| 4,384,205 A | 5/1983 | Flaum | |
| 4,625,111 A | 11/1986 | Smith, Jr. | |
| 5,900,627 A * | 5/1999 | Odom et al. | 250/269.7 |
| 7,365,307 B2 | 4/2008 | Stoller et al. | |
| 7,623,968 B2 | 11/2009 | Griffiths et al. | |
| 2009/0026359 A1* | 1/2009 | Stephenson et al. | 250/269.7 |

FOREIGN PATENT DOCUMENTS

| | | |
|---|---|---|
| WO | 2010135618 A2 | 11/2010 |
| WO | 2012012101 A2 | 1/2012 |

OTHER PUBLICATIONS

International Search Report for PCT Application Serial No. PCT/US2011/065570 dated Aug. 24, 2012.

* cited by examiner

*Primary Examiner* — Mark R Gaworecki
*Assistant Examiner* — Kenneth J Malkowski
(74) *Attorney, Agent, or Firm* — Cathy Hewitt; Jeremy Berman

(57) ABSTRACT

A method of formation evaluation using a pulsed neutron tool. The approach removes the effect of formation hydrogen index (HI) from the nuclear response of the tool. It can be used for gas detection and quantification, as well as for other fluids. It can also be used to improve a formation hydrogen index (HI) measurement.

21 Claims, 7 Drawing Sheets

GAS DETECTION AND QUANTIFICATION METHOD USING A PULSED NEUTRON LOGGING TOOL

BACKGROUND

Many of the present well logging approaches in formation evaluation are focused on the determination of oil saturation and therefore measurements in fluid-filled formations. For nuclear measurements, oil and fresh water can appear similar. In particular, the hydrogen index (HI) of water and a typical oil is almost the same. As the densities of oil and water are different by a few tenths of a $g/cm^3$, oil-filled and water-filled formations of the same overall hydrogen index will show a slight difference in bulk density.

Natural gas (methane) has a lower density than oil but contains about twice the number of hydrogen atoms per carbon atom. In open hole (OH) logging, the detection and quantification of gas is often based on a neutron-density cross over. While the neutron porosity curve (or in a more quantitative way, the hydrogen index curve) and the density porosity overlay in liquid-filled formations, there is a large separation between the two curves in gas. In the presence of gas, the hydrogen index drops, indicating lower liquid-filled porosity. The density drops as well, which corresponds to larger liquid-filled porosity.

Gas detection and quantification can be based on a measurement of the bulk density (assuming that the matrix density is known) and of the (thermal or epithermal) neutron porosity or of the HI of the formation, i.e., at least two independent measurements are used to obtain gas saturation. Neutron porosity and HI are measurements of the hydrogen content of the formation and therefore related to the fluid in the pore space. The bulk density measurement can be based on the measurement of the electron density of the formation and its transform into bulk density, and is sensitive to the matrix density, the formation porosity and the density of the fluid in the pore space. The neutron measurement can be used to obtain the HI of the formation, while the density measurement contains information on the bulk density of the formation and, if the matrix and fluid density are known, of the porosity of the formation.

Attempts have been made at using traditional gamma-gamma density tools in casing. However, the results have been unsatisfactory and the size of the OH tools limits the measurement to large casing inner diameters. Attempts have been made to replace the OH measurement by a cased hole measurement using a pulsed neutron tool. Such a tool would provide HI and a second quantity related to formation density, but remain unaffected by HI. Various pulsed neutron tools use at least two gamma-ray detectors at different spacings from the pulsed neutron source. The detectors will detect gamma-rays resulting from inelastic interactions of high energy neutrons with the material surrounding the tool, gamma-rays from the capture of epithermal and thermal neutrons as well as gamma-rays from the activation of formation materials.

The ratio of capture count rates of two detectors can be used for a measurement of the neutron porosity and/or HI of the formation, in a fashion similar to the porosity measurement obtained by compensated neutron logging tools, based on the ratio of thermal or epithermal neutron count rates at different detector spacings from the neutron source. Inelastic gamma-rays result from the interaction of fast neutrons (>1 MeV) with material surrounding the tool. The number of inelastic gamma-rays created in the formation is a function of the formation composition and in particular a function of the density of nuclei (atom density) in the formation weighted by their neutron inelastic cross section. In addition, the transport of the gamma rays after their creation is also sensitive to the electron density of the formation. Since the fast neutron slowing down process is a function indicative of HI, the inelastic gamma-ray creation is also a function of HI.

Many pulsed neutron methods for the detection and quantification of gas have been proposed over the years. In proposed methods, detection and quantification is based on the measurement of inelastic gamma-rays, which are assumed to have sensitivity to the formation density, and therefore the presence of gas. The measurement of inelastic gamma-rays is made difficult by two factors.

First, the gamma-rays observed during the neutron burst are not solely from the interactions of fast neutrons, because there are both epithermal and thermal capture during the burst. To obtain a "net inelastic" count rate, the capture background may be subtracted. Such a subtraction can be difficult and inaccurate, and the problem is exacerbated if the neutron burst is not well defined and if the detectors and material surrounding the detectors exhibit noticeable epithermal capture cross sections.

Second, the assumption that the inelastic count rate, even after a perfect subtraction of the capture background, is providing a signal that is only related to the formation density and not its HI is not correct. As mentioned above, the production of inelastic gamma-rays is influenced not only by the formation density but also by the formation HI.

SUMMARY

Here, we present a method of formation evaluation using a pulsed neutron tool. The approach removes the effect of formation hydrogen index (HI) from the nuclear response of the tool. It can be used for gas detection and quantification or more generally for the detection and quantification of formation fluids with different nuclear transport properties. It can also be used to improve the formation hydrogen index (HI) measurement in terms of environmental effect correction.

In order to obtain a reliable measurement of the presence of gas (such as, for example, but not limited to Methane, Ethane, Propane, Butane, $CO_2$, Helium, Nitrogen, Air, Water Steam), it is possible to provide a different kind of inelastic count rate measurement. A new inelastic measurement is obtained by a background subtraction method that provides a count rate, which is virtually free of effects from HI. No attempt is made to provide an inelastic count rate free of contamination by capture gamma-rays. Therefore, a measurement is provided that is independent of HI and related to formation inelastic cross section weighted atom density/electron density. The complicated and not fully defined quantity is referred to herein as "formation density" or "density," and can be combined with the HI measurement from the ratio of the capture count rates. The combination of these two measurements allows a determination of the gas saturation without using external information on the effective porosity of the formation.

In an embodiment, a method is provided for obtaining a pulsed neutron-induced gamma-ray response that is substantially free of sensitivity to the hydrogen index of a formation and related to formation inelastic cross section weighted atom density/electron density for formation evaluation. The method can include generating a neutron burst with a pulsed source of high energy neutrons. The method can also include detecting a plurality of gamma-ray counts by at least one gamma-ray detector, at least one number of burst counts being detected during a first time interval, in part of which the pulsed source is activated and at least one number of non-burst counts being detected during a second time interval in which the pulsed source is not activated. The method can also include outputting a quantity GRat relating to a formation parameter of interest, wherein GRat is substantially free of sensitivity to a hydrogen index of the formation, calculated as a function of the number of non-burst counts detected during the second interval and the number of burst counts detected during the first interval.

In an embodiment, an apparatus is provided for obtaining a pulsed neutron-induced gamma-ray response that is substantially free of sensitivity to the hydrogen index of a formation and related to formation inelastic cross section weighted atom density/electron density for formation evaluation. The apparatus can include a pulsed neutron source that generates a neutron burst. The apparatus can also include a gamma ray detector that detects a plurality of gamma-ray counts, a quantity of burst counts being detected during a first time interval, in which the pulsed source is activated and a quantity of non-burst counts being detected during a second time interval in which the pulsed source is not activated. The apparatus can also include a processor configured to a calculate a quantity GRat substantially free of sensitivity to a hydrogen index of the formation as a function of the number of non-burst counts detected during the second interval and the number of burst counts detected during the first interval; wherein GRat is related to a parameter of interest of the formation.

BRIEF DESCRIPTION OF THE DRAWINGS

FIGS. 4-1 and 5-2 show plots showing the effects of various borehole conditions on a GRat quantity obtained by a method embodiment of the present disclosure.

FIGS. 5-1 and 6-2 show a example plots of the lithology effects on a GRat quantity obtained by a method embodiment of the present disclosure, where GRat is normalized by a near detector gate A count rate.

FIGS. 7-1 and 7-2 show a example plots of shale effects on a GRat quantity obtained by a method embodiment of the present disclosure normalized by the near detector gate A count rate.

FIGS. 8-1 and 8-2 show a example plots of $CO_2$ effects on a GRat quantity obtained by a method embodiment of the present disclosure, where GRat is normalized by the near gate A count rate.

DETAILED DESCRIPTION

The method set forth here relates to well logging and in particular to the detection and quantification of gas in an earth formation surrounding the borehole or more generally to the detection and quantification of formation fluids with different nuclear transport properties. While the method is described in the context of a wireline logging tool and in particular logging through casing, the method is applicable also in open hole logging and in logging-while-drilling operations, independent of the means of conveyance. The method can be used to identify and quantify gas saturation, as well as that of other formation fluids other than the fluid used as the reference line in the present method, in that the boundaries between highly compressed gases and fluids under downhole conditions can be murky, and high density gases can chemically be similar to low density fluids under those conditions.

In the following description, numerous details are set forth to provide an understanding of the present disclosure. However, it will be understood by those skilled in the art that the present invention may be practiced without these details and that numerous variations or modifications from the described embodiments are possible.

The goal of the gas measurement is to differentiate the gas filled porosity from water filled porosity with an equivalent HI. The present disclosure introduces a method to derive an HI-independent gas measurement, which is related to the inelastic scattering of fast neutrons. The following section illustrates the basic physics of the inelastic gas measurement.

Figure 1:
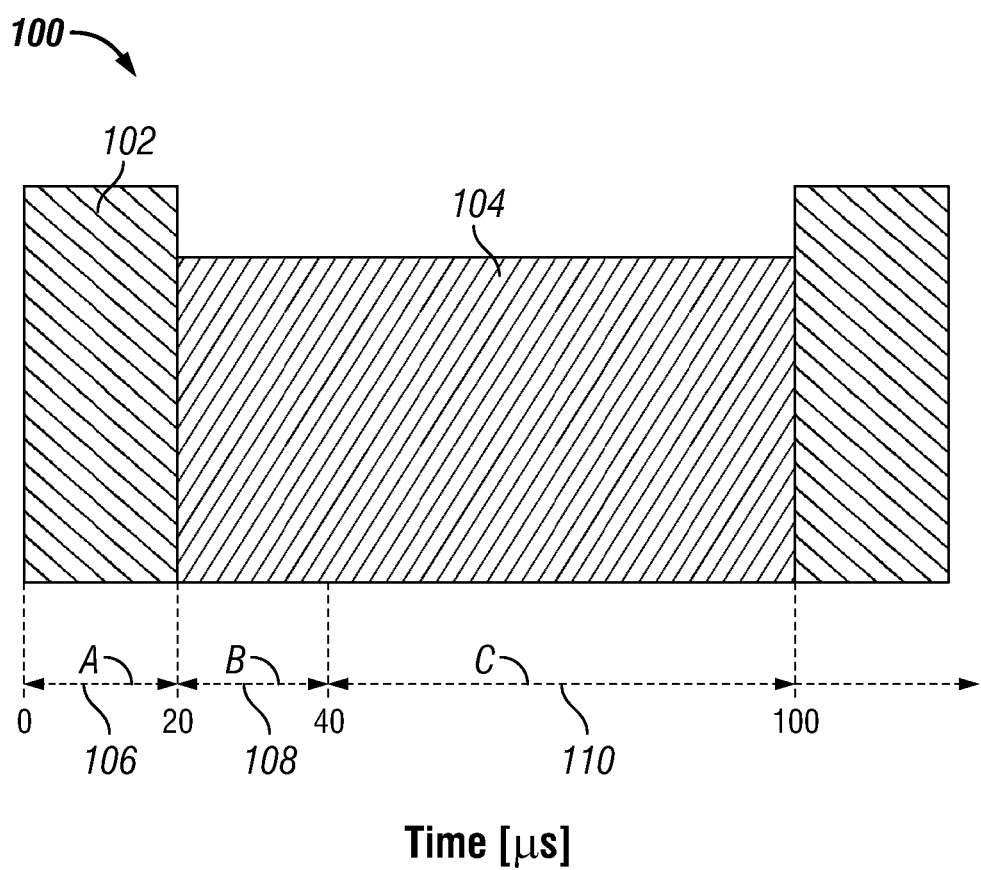
FIG. 1 shows an example of a neutron burst timing scheme for a gas measurement in accordance with an embodiment of the present disclosure.
Figure 2:
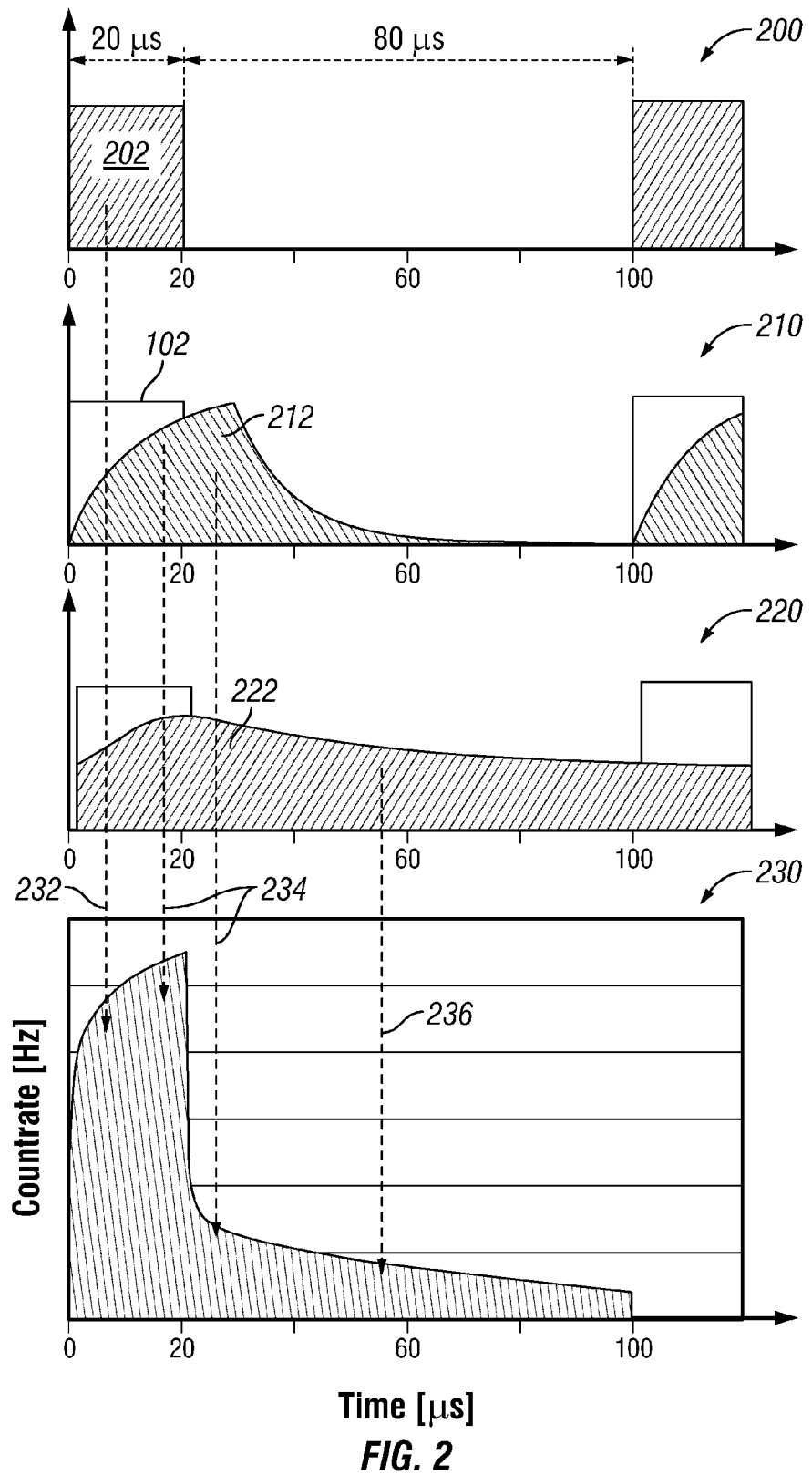
FIG. 2 shows a schematic representation of the neutron population as a function of time. The top panel shows the presence of the fast neutrons during the burst, the build up and decay of the epithermal neutron population, and the thermal neutron population, and the bottom panel shows a corresponding gamma-ray count rate as a function of time (also known as a multi-channel energy spectrum).

FIG. 1 shows an example of a neutron burst timing scheme, which can be used for an inelastic gas measurement. In each cycle (100), the source neutrons are emitted from 0 to 20 μs (102), followed by an 80 μs waiting time (104). Accordingly the three top panels 200, 210, 220 of FIG. 2 show the neutron flux in the formation as function of energy and time, which can be calculated using a simulation. The top panel 200 indicates the fast neutron flux 202 during the neutron burst, which ceases almost immediately at the end of the burst, the second panel 210 shows the epithermal neutron flux 212, which builds up as the fast neutrons slow down to epithermal energies. The third panel 220 represents the thermal neutron flux 222. As can be seen, during the neutron burst 102 from 0 to 20 s, there are neutrons with energies varying from the source energy (14 MeV) to thermal energy (0.025 eV at room temperature). The fast neutrons (indicated by 202) at the MeV energy level have been injected from the 14-MeV source and have not yet been slowed down. The epithermal neutrons (indicated by 212) are those with energy below the MeV level but still above thermal energy. The epithermal neutrons are mainly present during the neutron burst. Right after the burst, there will still be some epithermal neutrons but they will relatively quickly slow down to thermal energy. Thermal neutrons (indicated by 222) are present substantially throughout the timing mode. Sometime (for example, 10 μs to 20 μs) after the burst, substantially all the neutrons will be thermalized. There are also thermal neutrons during the burst, some of which are coming from previous bursts. Notably, there is not a visibly identifiably cutoff energy or time (in a multi-channel energy spectrum) to separate the fast, epithermal, and thermal neutrons.

In case the pulsed neutron tool includes gamma ray detectors but not neutron detectors, the tool can measure the prompt gamma rays from neutron interactions either inside or outside the detector, but not the neutrons directly. The bottom panel 230 of FIG. 2 shows an example of a gamma ray time spectrum, which represents the number of gamma-rays observed as a function of time with respect to the start of the neutron burst in the timing gate scheme of FIG. 1. There are two mechanisms of gamma ray generation from neutron interactions:

First, fast neutrons can generate prompt gamma rays through inelastic scattering or inelastic reactions, if their energy is higher than the threshold energy of the reaction. Those gamma rays 232 can be detected during the neutron burst, as shown in the bottom panel 230 of FIG. 2. The neutron inelastic threshold energy is several MeV for most of the common isotopes found in earth formations.

Second, neutrons can be captured by nuclei and generate gamma rays 234 and 236, which are detected in the detector, as shown in FIG. 2. Generally, the neutron capture probability increases as neutrons slow down to epithermal and thermal energies. Gamma-rays 234 due to the capture of epithermal neutrons are generated mainly during the burst and shortly after the burst. Gamma-rays 236 from thermal neutron capture can be generated during and after the burst. The capture probability for thermal neutrons may be much higher than for epithermal neutrons. However, if the neutron energy happens to be substantially equal to one of the resonance energies of an isotope, sometimes in the epithermal energy range, the probability for that neutron to be captured by the isotope may be high resulting in a large epithermal capture signal 234.

In some embodiments, the response of the epithermal and thermal capture gamma rays is dominated by the HI, because hydrogen nuclei dominate the slowing down of neutrons from the source energy to epithermal or thermal energies. In comparison, the response of the inelastic gamma rays is less impacted by HI, because fast neutrons can lose a large amount of energy during a single inelastic scattering event if their energy is above the inelastic threshold. The physics involved in the inelastic gamma ray measurement represents a complex coupled problem of neutron and gamma transport. It is related to the fast neutron population in the vicinity of the gamma ray detector, which is sensitive to both formation HI and inelastic cross section weighted atom density. On top of that, the inelastic gamma ray transport from the point of origin to the detector depends on the formation electron density. Therefore, there is HI-independent density information in the detected inelastic gamma rays.

As shown in FIG. 2, inelastic gamma rays appear during the neutron burst, during which there is a number of capture gamma rays as well, which have a large HI dependence. Therefore, the HI-independent density signal can be obscured by a large HI dependence. In some embodiments, the density sensitivity is a lot smaller than the HI sensitivity of the capture gamma rays. In reality, there will be quite large, complex, and non-intuitive environmental effects on both of them. Thus, it is challenging to separate the density and HI dependence in unknown conditions.

Figure 3:
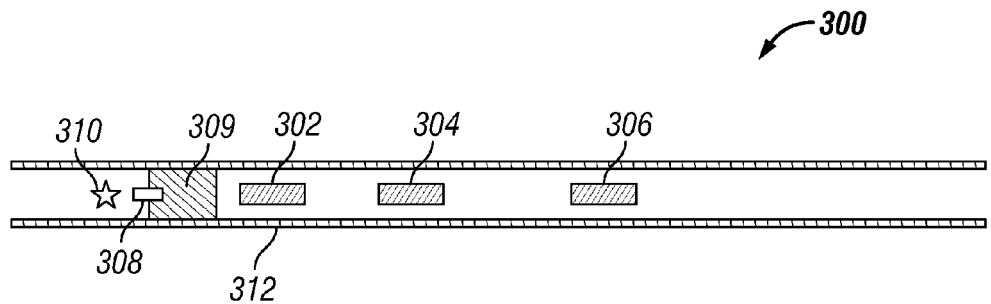
FIG. 3 illustrates one embodiment of an apparatus in accordance with an embodiment of the present disclosure.

An example tool 300 that could be used for implementing the gas measurement and quantification of the present disclosure is shown in FIG. 3. The tool of FIG. 3 shows the use of 3 gamma-ray scintillation detectors 302, 304 and 306 respectively and a neutron monitor 308 (which may be optional) to determine the neutron output of the neutron source 310, and optional neutron gamma shielding 309. The far detector 304 is optional for the inelastic measurement of the present disclosure. The source 310 and detectors 302, 304, 306 and optionally monitor 308 are enclosed in a tool housing 312. FIG. 1 shows a possible set of time gates 106, 108 and 110, during which the gamma ray spectra may be acquired. There should be at least one gate 106 during the neutron burst (Gate A) and a second gate (Gate B 108, or Gate C 110 or some other gate in the interval 104 during which no neutrons are emitted by the source 310). Modeling and experiments indicate that in order to obtain a good gas response, the nearest gamma-ray detector for gas measurement may be placed at a sufficient distance from the source, for example approximately 20 to 40 inches (around 50 cm to 101 cm).

The method presented here proposes separating the density and HI dependence of the gamma-rays detected during the neutron burst in a practical way. The method includes a pair of measurements: one is a burst measurement with both density and HI sensitivity (for example, total counts in the Deep detector 306 A-gate); the other is a "pure" HI measurement, which is dominated by HI (for example, total counts in the Deep detector 306 C-gate) but does not have a large sensitivity to density. Experiments and modeling have shown the HI sensitivities of the burst and post-burst measured count rates to be proportional to each other in a wide range of environmental conditions. As such, the HI dependence can be removed from the burst measurement in various conditions using the "pure" HI measurement (i.e. the count rate during a time interval that does not include the burst) multiplied by a calibrated coefficient. Then, the remaining count rate is sensitive to density, but not HI. The quantity obtained can be referred to as GRat for gas ratio.

The method outlined above provides options for optimizing a tool design. With a pulsed neutron tool designed and operated according to the method described in the previous paragraph, the density and HI dependence can be readily separated over a range of environmental conditions. The following examples prove that the approach is successful.

The method described in this disclosure removes HI dependence using formation water-filled porosity as a reference to obtain a water-porosity independent gas measurement. The method can be performed using other types of fluid porosity as a reference, for example it can use light-oil-filled porosity or mixed oil/water filled porosity. I.e. when one type of fluid-filled porosity is used as a reference the approach can be used to detect a different type of fluid.

Figure 4:
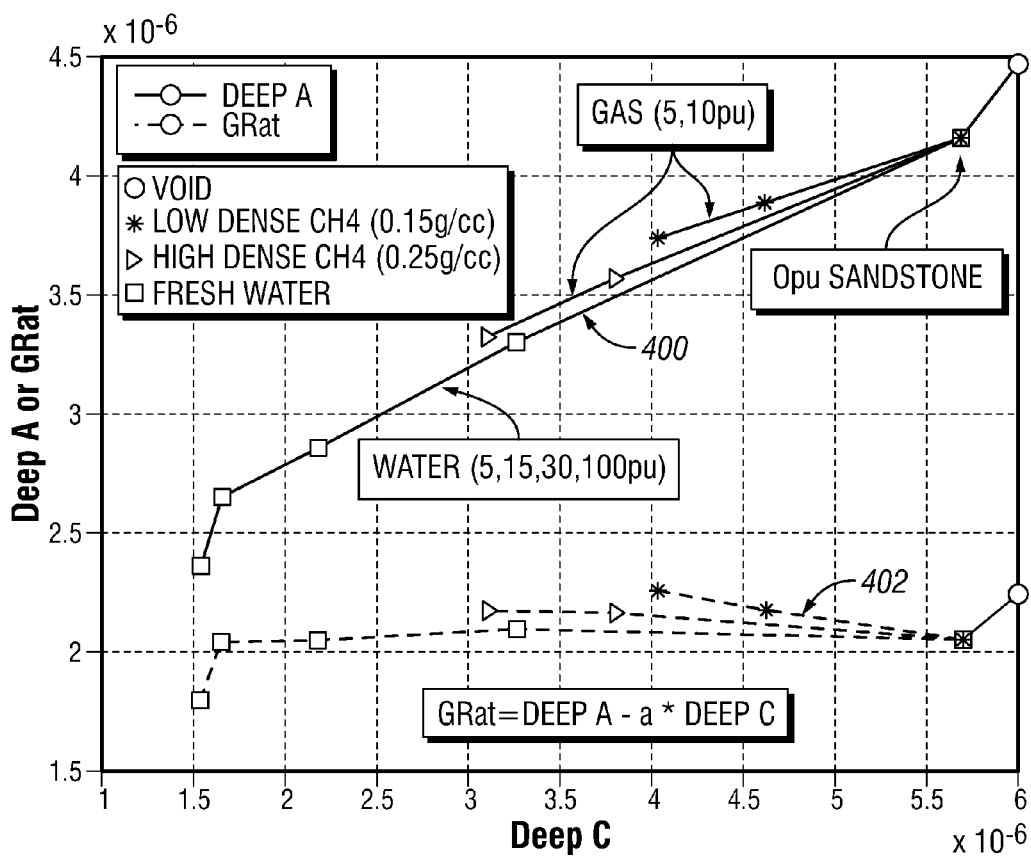
FIG. 4 shows a plot for example of the GRat quantity obtained by a method embodiment of the present disclosure based on modeled data for an 8-in borehole, 5.5-in casing, 15.5 lb./ft. casing weight and fresh water in the borehole, with GRat baseline (water filled) for a linear fit of the HI dependence between Gate A and Gate C.

FIG. 4 shows an example plot of the GRat quantity obtained by the method above based on modeled data for an 8-in borehole, 5.5-in casing, 15.5 lb/ft casing weight with fresh water in the borehole. FIG. 4 shows the cross plot of the deep detector 306 measurement pair Gate A (density and HI dependent) and Gate C (dominated by HI). In the case illustrated by FIG. 4, the "pure" HI measurement is obtained during gate C in the deep detector 306 (Deep C), as shown on the x-axis, which represents the neutron normalized gamma count rate. The normalization uses the neutron output of the source 310. In the embodiment shown in FIG. 3, normalization may be achieved by measuring the neutron output by using a neutron monitor 308. The measurement, which contains both density and HI sensitivity, obtained during gate A (gate during the neutron burst), is the neutron normalized count rate in the deep detector 306 (Deep A) shown as curve 400. As can be seen, the water branch from 0 p.u. to 30 p.u. is almost a straight line, which indicates that the HI sensitivities of the two measurements are proportional to each other. The two gas branches, which are methane gas with density of 0.15 g/cm$^3$ and 0.25 g/cm$^3$ at porosities of 5 and 10 p.u. are separated from the water branch. The GRat curve is shown as 402. GRat represents the HI corrected count rate from gate A, which is obtained according to Equation (1) below, where Deep_A and Deep_C are the neutron normalized count rates in the time gates A and C of the deep detector 306. The coefficient a is the slope of the water branch of the curve 400, which can be determined from modeling and/or experimental data. As can be seen, GRat does not change while water porosity increases from 0 p.u. to 30 p.u., and GRat increases if the gas volume increases.

$$GRat = Deep\_A - a*Deep\_C \qquad \text{Equation (1)}$$

The gas dynamic range of GRat is the difference of the value of GRat in gas-filled porosity from the water base line (water-filled porosity). The accuracy of the GRat determination is determined by the residual HI dependence in GRat for water filled porosity points in different borehole conditions. Residual HI dependence can be measured by the variability of GRat due to the fresh water porosity variation. The smaller the variability, the better the ability to differentiate gas from water porosity with an equivalent HI.

The approach described here is not an attempt to obtain a "net inelastic count rate", i.e., a count rate that includes only inelastic gamma-ray counts without contamination from thermal and epithermal capture. Rather, as mentioned before, the effect of HI, which would still be present in a net inelastic count rate, is excluded by the subtraction. The formula of the present method (such as Equation (1)) may look similar to the formula of thermal and epithermal background subtraction method (filed as Serial Number PCT/US10/35718, with a first provisional filing date of May 22, 2009) used to obtain a pure inelastic spectrum. The coefficients (such as a in Equation (1)) of the present method can be determined experimentally based on the water filled porosities, while background subtraction methods used for obtaining "net inelastic" counts include uncertainties due to the impossibility of accounting quantitatively for the amount of thermal, and particularly epithermal, capture contribution. The present approach allows a separation between the HI effect and the effect due to the number density of the nuclei and their inelastic scattering cross sections. The present approach produces an, unambiguous distinction between tight zones and gas-filled zones in cased hole without using external additional porosity (or density) information. The approach can also be used more generally to detect the presence of low density hydrocarbons.

A tool design with a low epithermal tool background, i.e. a low epithermal neutron capture cross section can facilitate the method by improving the proportionality of the HI sensitivity of the measurements that are used to determine GRat. The tool background can come from the scintillation crystal in any of the detectors, shielding material, housing material, and any other material that forms a part of the structure of the tool.

The present approach works for a wide variety of cases, i.e. different lithologies, borehole and casing sizes, as well as differences in borehole fluids with a single constant a. Refinements of the present method could use a different coefficient a in different environmental conditions. Additionally, the present method is not limited to using a linear equation to remove the HI dependence from a burst measurement. Other forms of the equation can be used as long as the HI dependence of the gas measurement is removed (or reduced to an acceptable level). For example, the coefficient a in Equation (1) can be a function of gate C counts in the deep detector 306, or one may use a completely different approach such as neural network or lookup table methods. The coefficient a could additionally be determined using other measurements from the tool or even from external information.

The example in FIG. 4 provides a demonstration of the method. In the example, the density-HI dependent measurement is the Gate A count rate of the deep detector 306 normalized by the neutron monitor output. In practice, the measurement can be chosen differently. The choice of the measurement with both density and HI dependence can be (but is not limited to): 1) The deep detector 306 burst gate (the gate can vary to cover part of the total burst or some of the after-burst) normalized by a neutron monitor. 2) The deep detector 306 burst gate normalized by a near detector 302 gate A. 3) The deep detector 306 burst gate normalized by a near detector 302 measurement with any timing gate of the near detector MCS spectrum. 4) The deep detector burst 306 gate normalized by a combination of several near detector 302 timing gates. For an example, normalization based on the near detector 302 gate A after thermal and epithermal background correction using near detector 302 gate B or C.

In the example in FIG. 4 the measurement with primarily HI and little or no density dependence is the neutron monitor normalized gate C count rate. However the HI sensitive measurement may be chosen differently and can be (but is not limited to): 1) Any timing gate of the deep detector 306 after the neutron burst normalized by a neutron monitor or a near detector 302 measurement, 2) A combination of several deep detector 306 timing gates after the neutron burst normalized by a neutron monitor 308 or a near detector 302 measurement. 3) A thermal (or epithermal) neutron detector measurement normalized by a neutron monitor 308, another neutron detector or a near GR detector 302 measurement. 4) Counts from the boron capture energy window of a boron shielded scintillator that are proportional to thermal and epithermal neutron flux (filed as Serial Number PCT/US11/41929, with an original provisional filing date of Jun. 30, 2010.

Figures 1, 5:
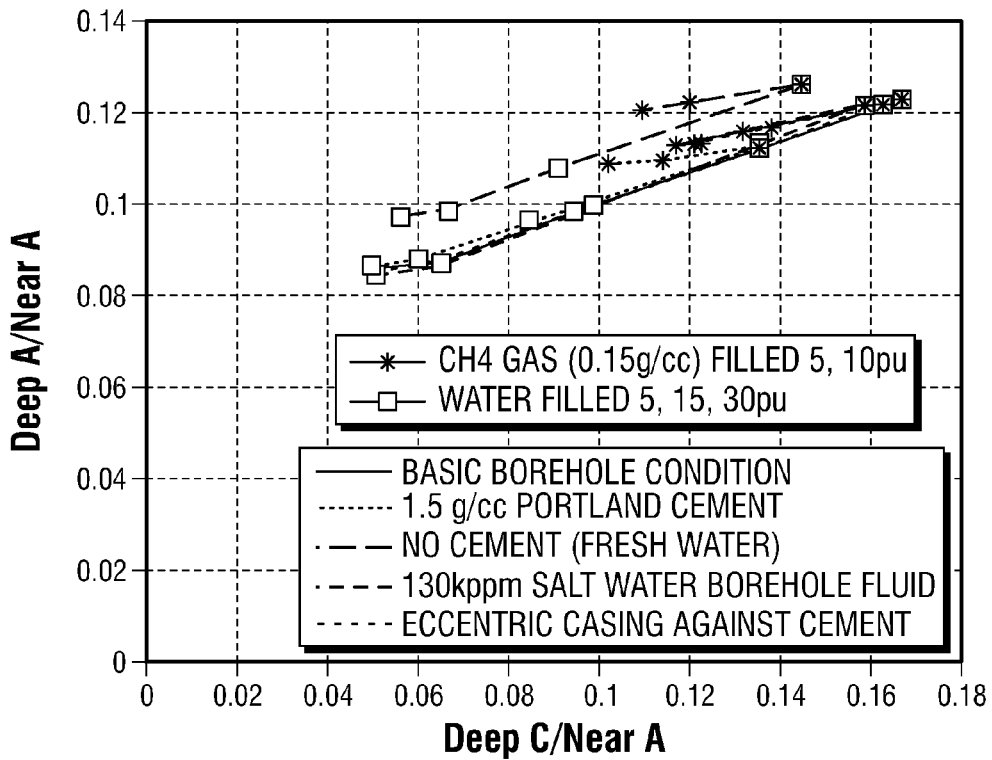
Figures 2, 5:
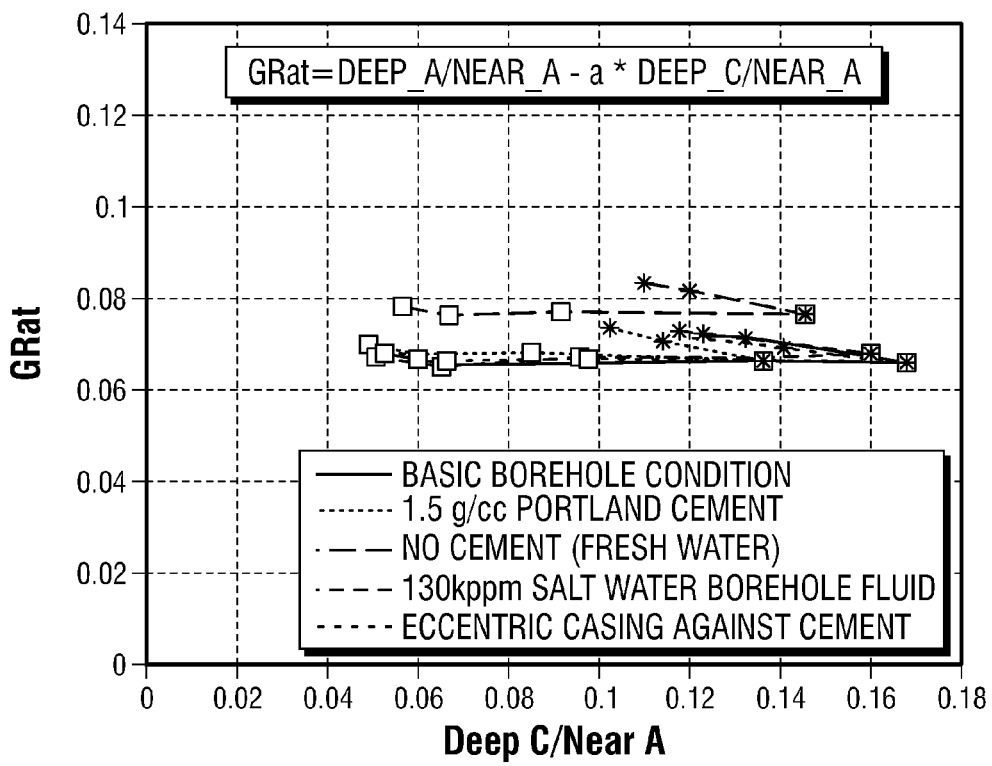

The approach described herein does not rely on the presence of a neutron monitor. In the absence of a neutron monitor, the neutron normalization can be performed by using a near detector 302 measurement, as described above. FIG. 5 show an example to use the gate A count rate of the near detector 302 to normalize both gate A and C count rates of the deep detector 306 in various environmental conditions. FIG. 5-1 shows the cross plot of the deep detector 306 gate A count rate normalized by the near detector 302 gate A count rate vs. the deep detector 306 gate C count rate normalized by the near detector 302 gate A count rate, which are the measurement pair for this example.

FIG. 5-2 shows the cross plot of GRat, which is calculated using Equation (2), vs. the HI measurement, which is the deep detector 306 gate C count rate normalized by the near detector 302 gate A count rate. As can be seen, GRat does not change as water-filled porosity increases from 0 to 30 p.u. compared to the gas dynamic range, independent of the borehole conditions. Although GRat may vary as a function of the borehole conditions, such variations do not depend on (liquid-filled) porosity. In other words, the offset of the GRat water filled porosity branch may vary under different borehole conditions, but the slope of the GRat water filled porosity branch remains close to zero.

Figures 1, 6:
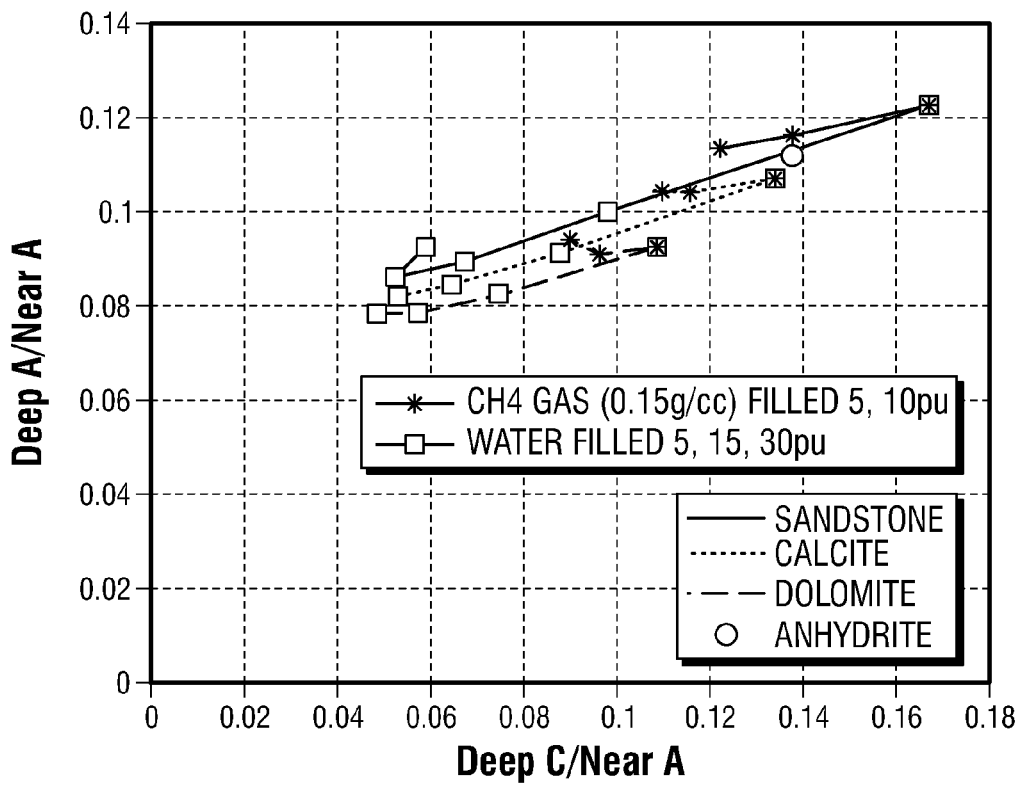
Figures 2, 6:
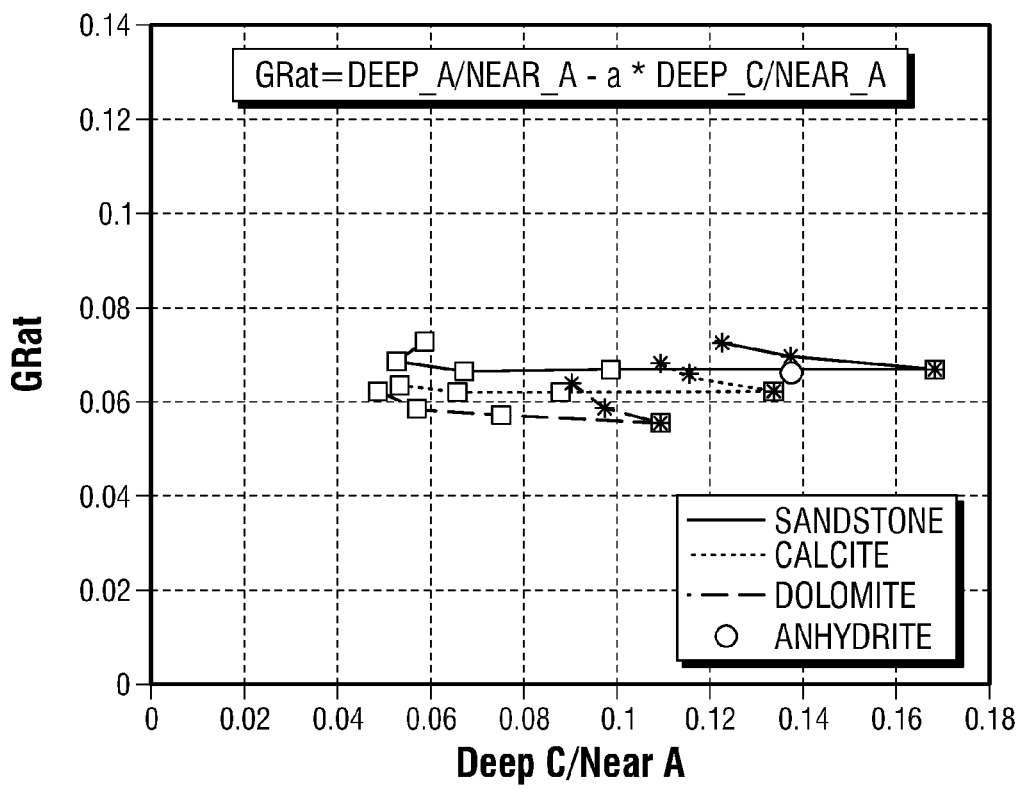

FIG. 6 show an example of removal of the HI effect in those environmental conditions based on a constant coefficient a, which can be different from the one in the example shown in FIG. 4.

$$GRat=[Deep\_A/Near\_A]-a*[Deep\_C/Near\_A] \quad \text{Equation (2)}$$

FIGS. 6-1 and 6-2 show an example of the lithology effects on the GRat method. The lithologies in FIGS. 6-1 and 6-2 include sandstone, limestone, dolomite, and anhydrite. There are lithology effects on GRat that are visible in the plot. Similar to the borehole effects, the lithology effects do not depend on formation HI. The slope of the water filled porosity branch of GRat remains close to zero for different lithologies. To further reduce the HI dependence on GRat, a different coefficient a can be determined and used for different lithologies. On the other hand, the offset of the water filled porosity branch depends on lithology, providing a lithology measurement if there is no gas porosity present.

Figures 1, 7:
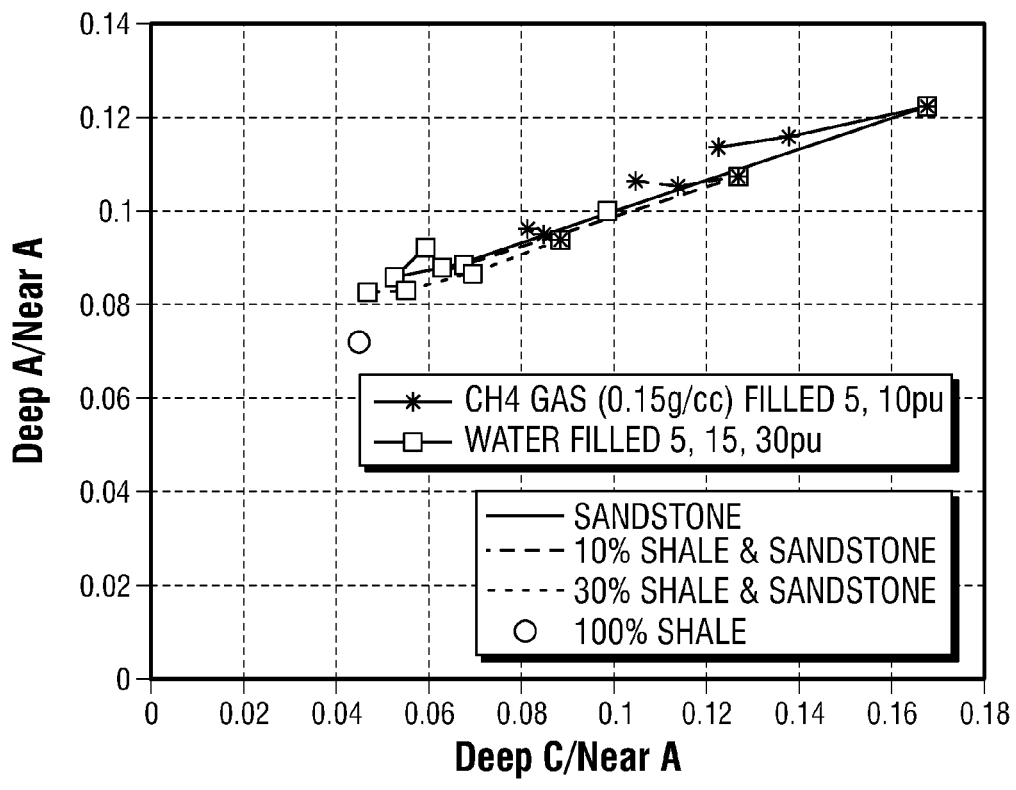
Figures 2, 7:
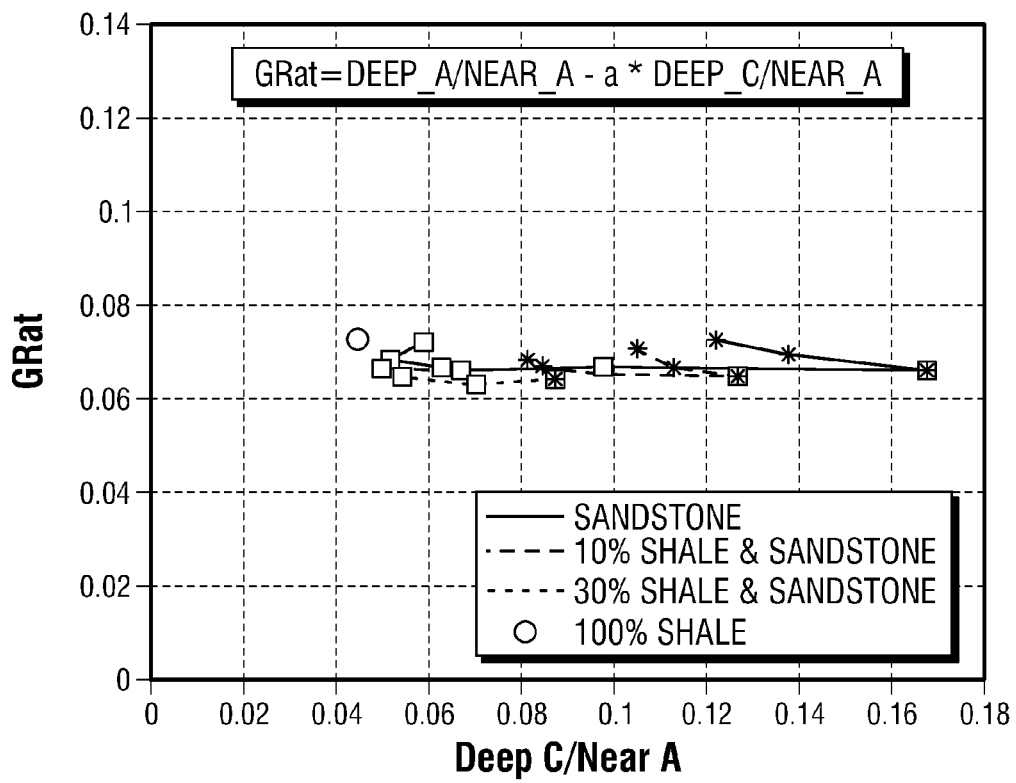

FIGS. 7-1 and 7-2 shows an example of the shale effects on GRat. In the example illustrated by FIGS. 7-1 and 7-2, the difference in GRat between the clean sandstone and 10% or 30% shaly-sand is small. The shale effect can be reduced further by selection of the timing gates of the deep 306 and near 302 detectors respectively. The method shown in the example can work well in a shaly-sand reservoir. GRat will remain substantially constant with the variation of shale volume or water porosity, but will increase when there is gas porosity.

The above examples show that there are environmental effects on GRat, some of which can be larger than the total gas dynamic range. However, those environmental effects do not depend on formation HI (water porosity), meaning that for constant borehole conditions, the GRat value in a low water porosity zone will be the same as the one in a high water porosity zone. As such, the method can be used for borehole correction for GRat in a field log. One can label the high HI zones (or high shale volume zones) based on an HI measurement (or natural gamma ray measurement); in these zones gas-filled porosity is unlikely. One can calculate the average value of GRat in those zones as a reference, and compare it to a low HI zone close by, assuming the borehole conditions do not change dramatically from one zone to another. If GRat in a high HI zone is the same as the one in a low HI zone, the low HI zone is likely to be a low-porosity water zone. If GRat in the low HI zone is higher than in the high HI zone, the low HI zone is likely to be a gas zone.

Figures 1, 8:
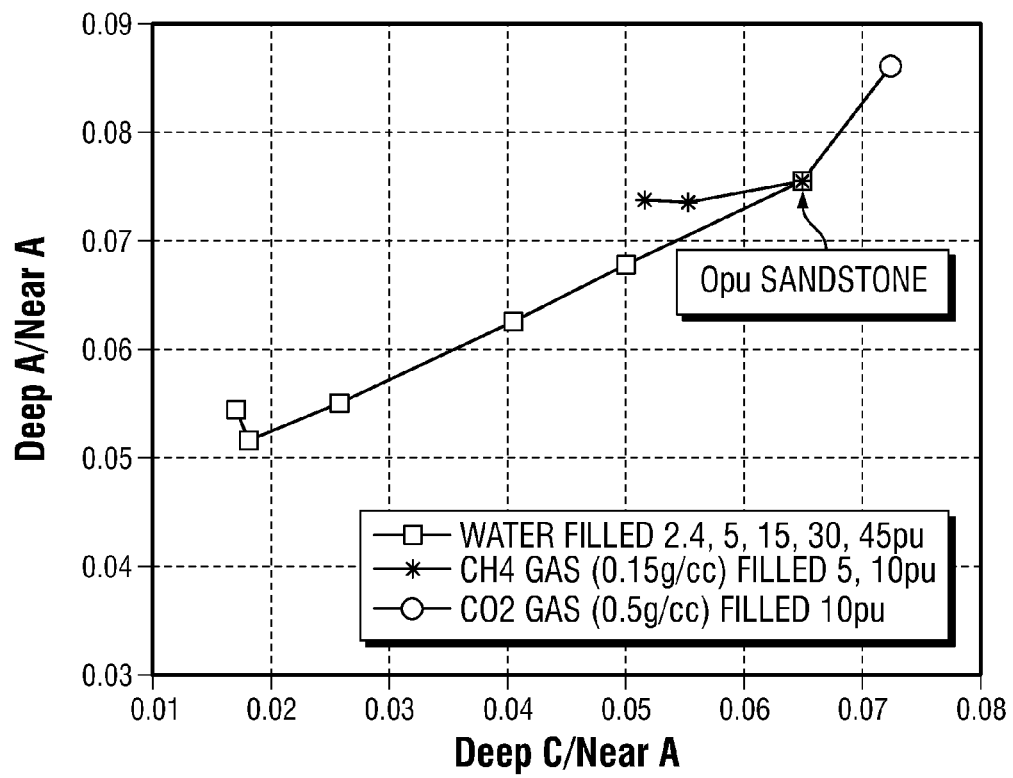
Figures 2, 8:
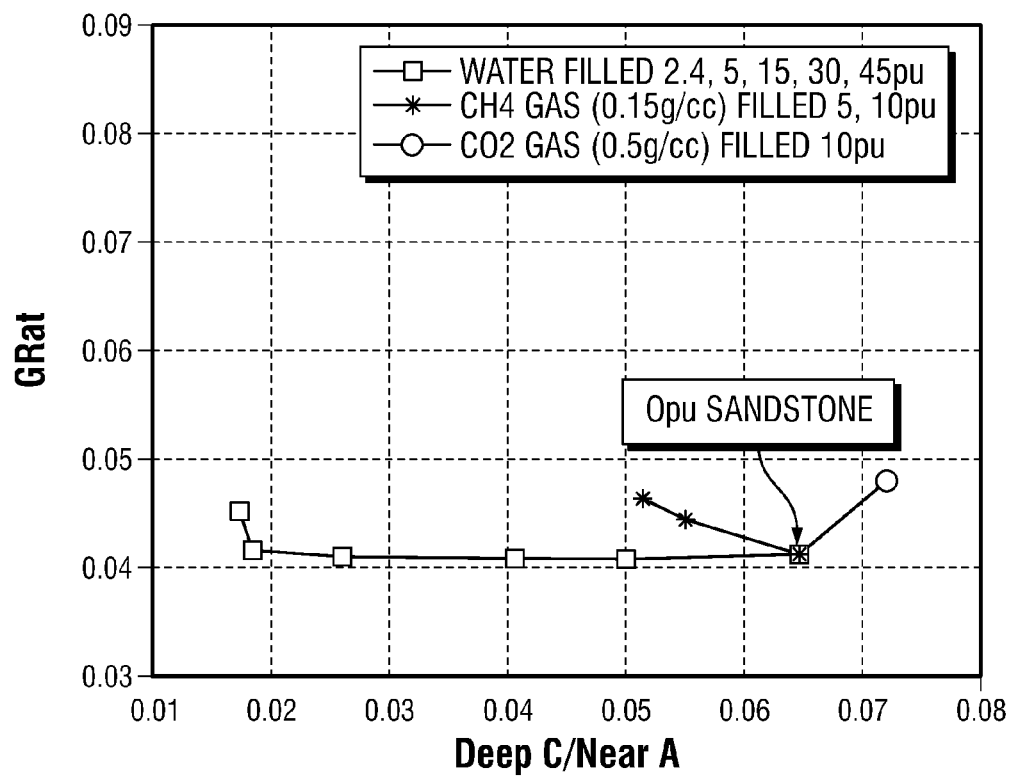

The GRat method described herein can also be used to determine the presence of $CO_2$ in the formation. Similar to FIG. 5-1, 5-2, 6-1, 6-2, 7-1, 7-2, FIGS. 8-1 and 8-2 show an example of a $CO_2$ gas measurement. FIG. 8-1 shows the cross plot of the deep detector gate A count rate normalized by the near detector gate A count rate vs. the deep detector gate C count rate normalized by the near detector gate A count rate. The "deep A/near A" (on Y axis) is sensitive to both density and HI, while the "deep C/near A" (on X axis) is an HI measurement. Using Equation (2), it is possible to remove the HI sensitivity to compute GRat, which is shown vs. the HI measurement in FIG. 8-2. As can be seen, GRat does not change as water-filled porosity increases from 0 to 30 p.u. compared to the gas dynamic range.

When the porosity is filled by gas, either hydrocarbon or non-hydrocarbon gas, GRat will be higher than in water filled porosity. Thus, the method also provides a way to differentiate water filled porosity from gas filled porosity. Furthermore, the hydrocarbon and non-hydrocarbon gas can be differentiated using the HI measurement. A hydrocarbon gas (e.g., $CH_4$ gas), due to of the Hydrogen content in the gas, will slow down fast neutrons more effectively similar to a low water-filled porosity case. The HI measurement (i.e., deep C/near A) decreases as shown in FIGS. 8-1 and 8-2. On the other hand, $CO_2$-filled porosity does not have hydrogen content. Compared to a 0-p.u. formation, the atom density decreases as the pore space increases. Therefore the neutron slowing down length increases beyond the already large slowing down length of the 0-p.u. formation. Thus, the HI measurement (i.e., deep C/near A) increases for $CO_2$ filled porosity, as shown.

Using both the GRat and a HI measurement, it is possible to differentiate gas-filled porosity from water filled porosity, as well as $CO_2$ gas-filled porosity from hydrocarbon gas filled porosity.

Applications

Above, a method is introduced to provide an HI-independent gas measurement based on measurements by a pulsed neutron logging tool. The HI-independent gas measurement referred to herein as GRat is primarily sensitive to the inelastic cross section weighted formation atom density/electron density and independent of formation HI/water porosity. Gas saturation can be calculated from the GRat measurement when the gas density is known. Additionally, a gas density could be solved for using another independent measurement that is sensitive to that parameter.

The HI-independent gas measurement GRat combined with an available HI measurement can be used to calculate the true formation porosity if the gas density is known. In a similar fashion, the formation bulk density can be calculated. The calculated bulk density may still have lithology effects. If the lithology is unknown, the lithology effects can be corrected based on other available measurements such as natural gamma ray (for shale correction) and or neutron induced gamma-ray spectroscopy.

The introduced method removes HI sensitivity from a measurement with density and HI sensitivity in order to make the measurement insensitive to changes in water filled porosity or other types of liquid filled porosity.

A tool design can be optimized to have a pair of measurements, one of which has HI and density dependence, while the other is dominated by HI, where the HI sensitivities of the two measurements are proportional or almost proportional to each other independent of the environment. Such optimization would make the tool even more usable for the method described above.

A tool design can be optimized in terms of detector crystal(s), spacing, neutron shielding, gamma ray shielding, tool housing construction and material, detector type (such as thermal or fast neutron detector, gamma detector), number of detectors, material near gamma detectors which can convert neutrons into gamma rays selectively according to their energy, neutron burst pattern or shape, etc. Such optimization would aim to improve the proportionality of the HI sensitivity between the measurements, which would make the measurements more usable for the method described above.

The two measurements can be optimized in terms of timing gate, neutron output normalization (either neutron monitor, near detector or another suitable detector or means of normalization, such as a pulsed neutron generator operating parameter indicative of the neutron output). The formulas for obtaining the two measurement quantities (can be a combination of multiple detectors and multiple timing gates) may differ from the embodiments described in equations (1) and (2). Such optimization would aim to improve the proportionality of the HI sensitivity between the measurements, which would make the measurements more accurate.

The timing gates chosen for the measurement during and after the burst can be optimized to provide the best accuracy or precision for the desired measurement under different downhole conditions. The optimization can be performed at the outset for an entire log or can be performed dynamically to adjust for changing downhole conditions. Such conditions may comprise changes in the formation such as lithology, formation sigma, or formation fluid composition or changes in the borehole environment, such as changes in casing, borehole fluid composition or borehole fluid sigma. Sigma denotes the macroscopic thermal neutron capture cross section.

In some embodiments, the GRat measurement is insensitive to HI but sensitive to environmental effects. In case of a non-gas reservoir, the measurement can be used to perform environmental corrections for other measurements such as an HI measurement. The environmental corrections can include lithology, borehole fluid, casing size, bit size, cement, etc. When the borehole conditions are known, the GRat measurement can be used to interpret the formation lithology.

In some embodiments, the GRat measurement is insensitive to HI (water porosity) when the porosity is lower than or equal to 30 p.u. From 30 to 100 p.u., the GRat measurement has some HI sensitivity, while the traditional HI measurements may not. Therefore, the GRat measurement can be used to improve the HI sensitivity in a high porosity environment. Additionally, the HI sensitivity of GRat in a high formation HI condition will not substantially affect the gas measurement, because gas porosity would need to reach more than 50 p.u. in order to provide similar formation HI as 30 p.u. water filled porosity. Such condition occurs relatively infrequently in reality, and one of ordinary skill in the art would find it relatively easy to differentiate gas from water in such high porosity.

An implementation of the method described here can also be used to remove the HI sensitivity of a gamma ray or neutron measurement that has density and HI sensitivity by using an HI-dominated measurement, the HI sensitivity of which is not directly proportional to the HI sensitivity of the density/HI measurement.

One could also use a lookup table or other similar means to correct a measurement sensitive to density and HI for its HI sensitivity differently under different conditions to enhance the measurement's accuracy.

Similarly, one can correct a gas measurement for differences in dynamic range as a function of the downhole environment using a lookup table or other similar means.

A tool can be designed to use the GRat method where the density sensitive measurement is from a scintillator with a low epithermal cross-section such as YAP, YSO or BGO.

A tool design can be optimized so that the lithology effect of the density measurement is small compared to the sensitivity to gas filled porosity for two or more target lithologies, such as, but not limited to, quartz and shale. Such optimization can be useful when these lithologies occur in various mixed forms.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method for obtaining a pulsed neutron-induced gamma-ray response that is substantially free of sensitivity to the hydrogen index of a formation and related to formation inelastic cross section weighted atom density/electron density for formation evaluation, the method comprising:
   generating a neutron burst with a pulsed source of high energy neutrons;
   detecting a plurality of gamma-ray counts by at least one gamma-ray detector, at least one number of burst counts being detected during a first time interval, during which the pulsed source is activated and at least one number of non-burst counts being detected during a second time interval during which the pulsed source is not activated;
   outputting a quantity GRat relating to a formation parameter of interest, wherein GRat is substantially free of sensitivity to a hydrogen index of the formation and is calculated as a function of the number of non-burst counts detected during the second interval and the number of burst counts detected during the first interval;
   enhancing a high porosity response of a hydrogen index measurement using GRat when a porosity of the formation exceeds 30 p.u.

2. The method according to claim 1, further comprising normalizing the gamma-ray counts with a neutron output of the pulsed source.

3. The method according to claim 2, wherein the neutron output is determined by a monitor detector as a fast neutron flux output by the pulsed source.

4. The method of claim 1, further comprising normalizing the gamma-ray counts measured by the at least one gamma-ray detector at a first axial location from the neutron source by a gamma-ray count of a second gamma-ray detector at a second axial location from the pulsed source.

5. The method of claim 4 wherein the gamma-ray counts of the second detector are determined during a time interval during which the pulsed source is activated.

6. The method according to claim 1, wherein the at least one number of burst counts being detected during the first interval has a dependence on hydrogen index and a dependence on density; and wherein the at least one number of non-burst counts being detected during the second interval has a dependence on hydrogen index.

7. The method according to claim 1, wherein the detecting may is performed by a plurality of detectors selected from the group consisting of a near detector, a far detector, a deep detector, a monitor detector, and combinations thereof.

8. The method according to claim 7, wherein the quantity of burst counts detected during the first interval is obtained by the deep detector in a first burst gate and normalized by a combination of a plurality of counts obtained by the near detector.

9. The method according to claim 7, wherein the quantity of non-burst counts from the second time interval is normalized by a plurality of counts obtained by the near detector.

10. The method of claim 1, further comprising detecting gas in the formation from the deviation of GRat from a water porosity line.

11. The method according to claim 1, further comprising combining GRat with a gas density and a hydrogen index measurement to determine a gas saturation level.

12. The method of claim 1, further comprising basing GRat at least in part on a measurement relating to a reference fluid, and detecting a fluid with different nuclear transport properties than the reference fluid from the deviation of GRat from the measurement relating to a reference fluid.

13. The method according to claim 12, further comprising computing the saturations of the GRat reference fluid and a known second fluid in the formation using GRat and a hydrogen index measurement.

14. The method according to claim 11, comprising combining GRat with one or more hydrogen index measurements and gas density to calculate a formation porosity.

15. The method according to claim 1, further comprising interpreting lithology of the formation based on GRat.

16. The method according to claim 1, further comprising interpreting fluid composition in the borehole based on GRat.

17. The method according to claim 10, wherein the gas comprises at least one of Methane, Ethane, Propane, Butane, $CO_2$, Helium, Nitrogen, Air, Water, and Steam.

18. The method according to claim 17, further including the identification of the gas using GRat in combination with the hydrogen index measurement.

19. An apparatus for obtaining a pulsed neutron-induced gamma-ray response that is substantially free of sensitivity to the hydrogen index of a formation and related to formation inelastic cross section weighted atom density/electron density for formation evaluation, comprising:
   a pulsed neutron source that generates a neutron burst;
   a gamma ray detector that detects a plurality of gamma-ray counts, a quantity of burst counts being detected during a first time interval, in which the pulsed source is activated and a quantity of non-burst counts being detected during a second time interval in which the pulsed source is not activated; and a processor configured to a calculate a quantity GRat substantially free of sensitivity to a hydrogen index of the formation as a function of the number of non-burst counts detected during the second interval and the number of burst counts detected during the first interval; wherein GRat is related to a parameter of interest of the formation;

the processor further configured to enhance a high porosity response of a hydrogen index measurement using GRat when a porosity of the formation exceeds 30 p.u.

20. The apparatus of claim 19, where the parameter of interest is one of gas saturation, saturation of a fluid other than gas, formation density, formation lithology and borehole fluid.

21. The apparatus of claim 19, configured for conveyance on one of a wireline, a slickline, a wired drill pipe, a drill string, and a coiled tubing apparatus.

* * * * *